April 25, 1933. W. D. WILCOX 1,905,326
PROCESS OF PRODUCING MIXTURES OF CARBON MONOXIDE AND HYDROGEN
Filed June 28, 1930
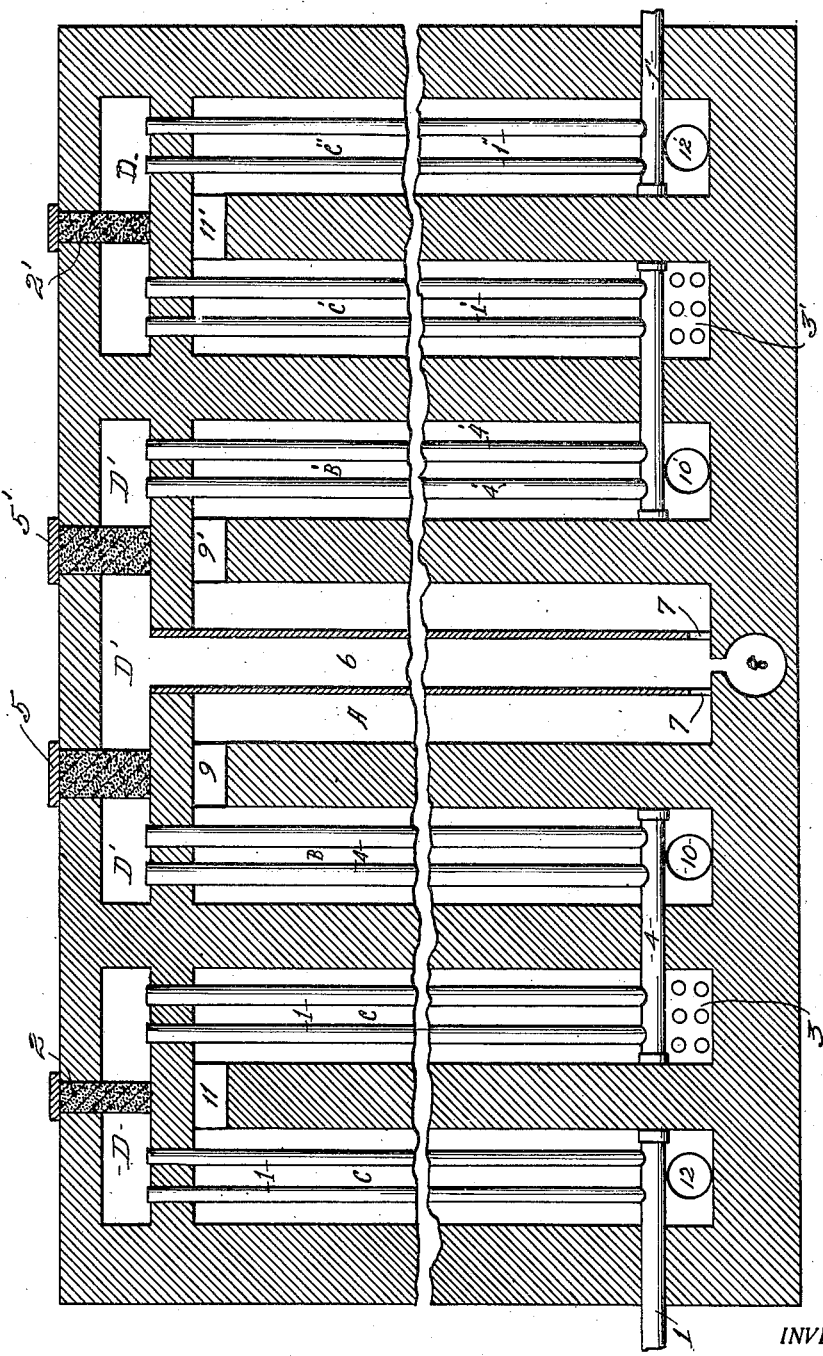
INVENTOR.
William D Wilcox Patented Apr. 25, 1933

1,905,326

UNITED STATES PATENT OFFICE

WILLIAM D. WILCOX, OF LAWRENCE, KANSAS

PROCESS OF PRODUCING MIXTURES OF CARBON MONOXIDE AND HYDROGEN

Application filed June 28, 1930. Serial No. 464,689.

The dissociation of hydrocarbon gases and vapors with the production of hydrogen and oxides of carbon, by heating a mixture of such gases with steam to temperatures of 1800° F. and beyond has been carried out over a long period of years either by passing the mixture through a body of coke or in contact with checker brick heated to a high temperature by precedent blasting, or less frequently through heating by external means a pipe or conduit through which the mixture of gas and steam is circulated. The reaction has in many cases been accelerated by the use of catalysts. This reaction may be indicated by the equations $$CH_4 + H_2O + heat = CO + 3H_2,$$
$$C_2H_6 + 2H_2O + heat = 2CO + 5H_2, \text{ etc.}$$

It has been the general fact that this reaction has not been complete. More or less of undecomposed hydrocarbons have remained in the product. While temperatures have been attained at which, equilibrium relations being established, the elimination of the hydrocarbons would be substantially complete, the time required for this equilibrium to be attained at these temperatures has been so long as to make its attainment commercially impracticable. The rate of dissociation is slowed down by the presence in the mixture of increasing proportions of hydrogen and carbon monoxide.

For most uses it has been of no great importance that there remained a substantial proportion of methane or other hydrocarbons in the gaseous product. But when it is proposed to employ the mixture for the synthesis of methanol, their presence is seriously objectionable. Not only are effective pressures within the convertor as well as the content of synthesizable gases materially reduced, but as the carbon monoxide and hydrogen are united and withdrawn as methanol, with the residue gases recirculated, the proportion of hydrocarbon gases constantly becomes greater, so that in a short time it becomes necessary to purge the mixture from the convertor and circulating system, releasing to less valuable uses a large proportion of the hydrogen and carbon monoxide along with the hydrocarbons.

It is also important that the proportion of carbon monoxide to hydrogen be very closely as one to two. While better results appear to be obtained in the synthesis to methanol, where the proportion of hydrogen in the convertor is in excess of the proportion at which it unites to form methanol, it tends to increase and to become excessive. While in starting operation a mixture more largely hydrogen may be introduced, the maintenance of continuously satisfactory operating conditions requires that the additions made to replace the gases removed as methanol shall be in the proportions at which they unite according to the equation $$CO + 2H_2 = CH_3OH.$$

It will readily appear that a considerable variation from the ratio of one volume of CO to two of hydrogen in the final product will result from variation in the proportions in which carbon and hydrogen exist in the hydrocarbons treated, other conditions being constant, so may readily be brought about by varying the volume of hydrogen burned in the combustion chamber by varying the relative volume of oxygen introduced in the final stage of the dissociation. I desire to have what is new and novel in my procedure applicable to the production of a mixture of carbon monoxide and hydrogen in relative proportions other than one and two to the extent that is adapted to the production of such variable mixtures.

The most difficult task is to create within the hydrocarbon gases a temperature which will both rapidly and completely dissociate them. Such maximum temperatures are most readily obtained by precedent blasting of refractory surfaces which are the medium of heat storage and transfer but since the reaction $CH_4 + H_2O = C + 3H_2$ is highly endothermic both through the heat absorbed in breaking up the hydrocarbon molecule (105 B. t. u. per cubic foot of methane) and the heat required to dissociate the steam molecule, these surfaces are quickly cooled and the reaction during the end of the dissociation cycle is not likely to be complete.

In the purging and reheating, inert gases are likely to be added to the product sought. Heating by external means in a continuous process, pollution by inert gases may be avoided and a constant temperature and a constant rate of passage of the gases treated through the conduit closely maintained, but there is great difficulty in finding any metal alloy which will withstand the high temperature required and if the walls of the conduit be of refractory material, its poor conductivity compels a high differential in temperature between the exterior and interior of the conduit with resulting poor efficiency in the transfer of heat.

Another difficulty presents itself in the fact that using as the material processed, natural gas, coke oven gas, or still gases from the cracking of petroleum, which are the most available sources of hydrocarbon gas, the product where decomposed with steam contains more than the desired proportion of hydrogen, in the case of methane three volumes where only two are desired.

In my procedure, I prefer to employ external heating, passing the gaseous mixture through pipes of heat-resistant nickel chrome alloy surrounded by hot gases, adding to the hydrocarbons, a volume of steam which may be somewhat greater than is necessary to supply sufficient oxygen to oxidize the hydrocarbons of the gas to monoxide. I will preferably employ a catalyst to accelerate the dissociation, but such use of a catalyst forms no part of this invention, nor is its use essential to obtaining the result sought. It has been demonstrated that an 80% dissociation may be attained by external heating within the temperature range of 1,800° F. to 2,000° F. This is a temperature which may safely be employed, using pipes of heat-resistant alloy, without such impairment of the pipes as will render the procedure impractical.

It has been proposed to obtain a carbon monoxide hydrogen mixture by passing hydrocarbons to which have been added both oxygen and steam through an externally heated conduit the heat of combustion with the oxygen aiding in the heating. This is open to the objection that the addition of heat to the mixture by such combustion reduces the input of heat externally derived. The final temperature will be no more than is fixed by the capacity of the pipes to withstand heat.

In another proposal, oxygen is added to effect the reaction $2CH_4 + O_2 = 2CO + 4H_2$, the hot gases resulting being employed to preheat the hydrocarbon gases prior to addition of oxygen. The total heat so generated will increase the temperature only by 720° F., which, even with the preheating is inadequate. I prefer to employ an external means of heating and of effecting dissociation prior to such procedure transforming sensible heat from an external source into potential heat through the dissociation of a portion of the hydrocarbons and steam and to postpone the admission of oxygen until the highest temperature has been attained by the gas treated, which may readily be brought about in this way: for simplicity of illustration I will assume the hydrocarbon treated to be a pure methane, such as forms the chief component of natural gas. With 80% dissociation, $$10CH_4 + 11H_2O + \text{heat}$$

becomes $2CH_4 + 3H_2O + 24H_2 + 8CO$. It is assumed to have been brought to a temperature within the range 1,800°–2,000° F. I now will add to this mixture of gases 5 cubic feet of oxygen. At the temperature assumed, oxygen unites with carbon to form CO rather than with hydrogen. This is the basis of the water gas reaction $$C + H_2O = CO + H_2.$$

It unites with hydrogen according to the equation $2H_2 + O_2 = 2H_2O$ in preference to union with CO to form $CO_2$. While some intermediate reactions may occur, the final result quickly obtained at the very high temperature resulting from the oxidation of a large proportion of hydrogen may be represented by the equation $$2CH_4 + 3H_2O + 24H_2 + 8CO + 5O_2 = 10CO + 11H_2O + 20H_2.$$

Where hydrocarbons of greater carbon content are processed this excess of carbon will be oxidized by the steam, less hydrogen will be burned, and the steam in the product will be less in volume than the steam originally introduced. When the composition of the gases treated is known and are kept approximately constant, there will be no difficulty in so proportioning the volume of oxygen introduced as to secure a product in which the proportions of monoxide and hydrogen are one and two.

The gist of my procedure is in the creation of potential heat within the gas treated by the dissociation of steam to form hydrogen and the use of this potential heat as an addition to that attained by external heating to secure a final temperature of the mixture much higher than can be attained by either the usual methods of heating or by the use of oxygen in the manner which has been proposed by others.

Assuming the volumes stated in the illustration to be in cubic feet, there is generated in the reaction above the amount of heat absorbed in the dissociation of the remaining hydrocarbons (2 cu. ft. $CH_4$) 1,174 B. t. u. This is sufficient to increase the temperature of the gaseous mixture over 1,300° F. less only such reduction as arises from the increase in the specific heat of gases with rise in temperature. I can rely with assurance upon a completeness of dissociation which has not in fact been attained by existing practice. I may even in the actual operation obtain satisfactory results with a less degree of preheating than has been stated. There is a margin of safety. The heat so imparted to the gas is not lost as will be seen from an examination of the drawing filed with and forming a part of this specification. The sensible heat of the gaseous product as finally brought to the composition desired is employed to preheat the gas so as to effect the initial dissociation of 80% resulting from external heating and to bring it to the final high temperature which it must posses at the point in its travel where the oxygen is introduced. But this alone would not be adequate. It is necessary to obtain some heat by the combustion of fuel and to pass it into the gas during the initial treatment.

The use of temperature indicating devices and an analysis of the gas withdrawn at several points in its travel will very readily indicate the volume of combustible gas which must be burned in unit time to meet the requirements of the process. This being determined and means of controlling the pressure of supply being provided, operative conditions such as yield the desired results may be continuously maintained with little supervision.

Referring to the drawing. This shows a vertical cross section of a series of chambers enclosed by refractory walls. A may be called the dissociation chamber as it is in this chamber that the final elimination of the hydrocarbons is completed. B and B' may be called secondary preheating chambers. These are identical. The process may be carried out using one only, but placing one on each side of the highly heated chamber A seems to effect some advantage in preventing the escape of heat such as leads me to give a preferance to this duplication. C and C' may be called the primary preheating chambers. These are duplicates of each other. In operation gas and steam in the proportions required by the composition of the gas are admitttd through pipe system 1 to C. They pass up C counter current to the flow of combustion gases from gas burner 3 which in turn pass through C by means of cross connection 11 and out through 12. The heated mixture of gas and steam may be passed into D and through catalyst mass 2 composed of permeable material impregnated with a suitable catalyst, but this use of a catalyst as noted is not necessary to the success of the process. The gas is passed downward into system of pipes 4 enclosed in B, into chamber D' and through catalyst mass 5, down 6 the walls of which will be constructed of highly refractory material and into A through openings 7 and 7', where it unites with oxygen passed upward from pipe 8. The same procedure has been taking place concurrently in pipe systems 1' and 4' enclosed in chambers C' and B'.

The gas being initially heated by the combustion products from gas burner 3' passing counter current through C' to outlet 12', its dissociation has been accelerated by passage through catalyst masses 2' and 5'. It passes down through 6 and into A through 7 and 7'. The hot gas passes counter current to the entering gases through B and B' to outlets 10 and 10'. It may be noted that if the temperature of the gas at the inlet to 6 be within the range 1,800–2,000° F. as is proposed and which may be determined by the use of a thermocouple, any passage of heat from A through the walls of 6 into the descending current of gas will not effect any reduction of the final temperature; but will, through its increase of the temperature at the point of union or of exothermic reactions, result in an actual increase of the final temperature obtained and of the effectiveness of the reaction.

In the carrying out of my process I do not limit myself to the employment of plant in all respects identical with that shown by the drawing. I may as a result of operating experience employ to a greater extent refractory materials in place of the pipes of heat-resistant alloy indicated in the zones of highest external heat.

What I claim as new and desire to protect by the issuance to me of Letters Patent is:

1. The process of converting hydrocarbon gases and vapors into a mixture of carbon monoxide and hydrogen in the volumetric proportions of one and two which comprises adding to the hydrocarbon vapors a volume of steam more than sufficient to oxidize the carbon content of the gases to monoxide, passing the mixture through a conduit heated externally to a temperature in excess of 1,800° F. and continuing the heating until a dissociation approaching 80% has been effected; adding to the mixture of gases a volume of oxygen sufficient to oxidize the carbon in the undecomposed residue of hydrocarbon gases to carbon monoxide and to convert to water vapor all hydrogen in excess of twice the volume of carbon monoxide.

2. The proces of converting hydrocarbon gases and vapors into a mixture of carbon monoxide and hydrogen in the volumetric proportions of one and two which comprises adding to the hydrocarbon vapors a volume of steam more than sufficient to oxidize the carbon content of the gases to monoxide passing the mixture through a conduit heated externally to a temperature in excess of 1,800° F. and continuing the heating until a dissociation approaching 80% has been effected; adding to the mixture of gases a volume of oxygen sufficient to oxidize the carbon in the undecomposed residue of hydrocarbon gases to carbon monoxide and to convert to water vapor all hydrogen in excess of twice the volume of carbon monoxide; employing the resultant hot gases as a means of preheating the gaseous mixture by withdrawing them through the chamber enclosing the conduit in a direction of flow counter current to the travel of the hydrocarbon gas to the point of oxygen admission.

3. The process of converting hydrocarbon gases and vapors into a mixture of carbon monoxide and hydrogen in the volumetric proportions of one and two which comprises so heating a mixture of hydrocarbon gases and steam to a temperature in excess of 1,800° F. as to effect a dissociation approaching 80% of the hydrocarbons maintaining the mixture at a temperature in excess of 1,800° F. and adding thereto such a volume of oxygen as is sufficient to oxidize to carbon monoxide the carbon in the undecomposed hydrocarbons and to convert to water vapor any hydrogen in excess of twice the volume of the carbon monoxide in the resulting product.

4. The process of converting hydrocarbon gases and vapors into a mixture of carbon monoxide and hydrogen in the volumetric proportions of one and two which comprises adding to the hydrocarbons a proportion of steam adequate to supply oxygen sufficient to oxidize the carbon in the hydrocarbons to monoxide, subjecting the mixture to a temperature substantially in excess of 1,800° F. until a dissociation of the hydrocarbon gas approaching 80% has been effected; maintaining the gaseous mixture at a temperature in excess of 1,800° F. and intimately mixing therewith such a volume of oxygen as will oxidize to carbon monoxide the carbon content of the undecomposed hydrocarbons and oxidize to water vapor all hydrogen in excess of twice the volume of carbon monoxide in the gaseous product.

5. The process of converting hydrocarbon gases and vapors into a mixture of carbon monoxide and hydrogen in controlled proportions, which comprises effecting a partial dissociation of the hydrocarbons in admixture with steam by passing them through an externally heated conduit, bringing them to a temperature in excess of 1800° F., then adding to the gases within a combustion chamber a volume of oxygen sufficient to oxidize the carbon in the undecomposed hydrocarbons to carbon monoxide, and to convert to water vapor any excess of hydrogen above the volume relative to the volume of carbon monoxide which is desired.

6. The process of obtaining a mixture of carbon monoxide and hydrogen in controlled proportions by the dissociation of hydrocarbon gases and vapors, which comprises effecting a partial dissociation by passing the hydrocarbon gases in admixture with steam through an externally heated conduit, bringing them to a temperature in excess of 1800° F., and thereafter adding to the gaseous mixture a volume of oxygen sufficient to oxidize the carbon in any undecomposed hydrocarbons to carbon monoxide, and to convert to water vapor any hydrogen in excess of the volume relative to the volume of carbon monoxide which is desired, utilizing the sensible heat in the gaseous product in the heating of the conduit.

In witness whereof, I affix my signature.

WILLIAM D. WILCOX.